(12) United States Patent
Anicette

(10) Patent No.: US 11,204,228 B2
(45) Date of Patent: Dec. 21, 2021

(54) MARKING AND MEASURING DEVICE

(71) Applicant: Fequiere Anicette, Niagara Falls (CA)

(72) Inventor: Fequiere Anicette, Niagara Falls (CA)

( * ) Notice: Subject to any disclaimer, the term of this patent is extended or adjusted under 35 U.S.C. 154(b) by 160 days.

(21) Appl. No.: 16/559,914

(22) Filed: Sep. 4, 2019

(65) Prior Publication Data

US 2021/0063131 A1 Mar. 4, 2021

(51) Int. Cl.
*G01B 5/00* (2006.01)
*G01B 3/30* (2006.01)

(52) U.S. Cl.
CPC .............. *G01B 5/0028* (2013.01); *G01B 3/30* (2013.01)

(58) Field of Classification Search
CPC .......... G01B 5/0028; G01B 3/30; B60T 17/00
USPC ............................................................ 33/609
See application file for complete search history.

(56) References Cited

U.S. PATENT DOCUMENTS

| | | | |
|---|---|---|---|
| 3,628,253 A * | 12/1971 | Shepard | B25H 7/04 33/578 |
| 4,782,595 A * | 11/1988 | Diewert | G01B 5/0028 33/610 |
| 5,343,628 A * | 9/1994 | Ham | B60S 5/00 33/288 |
| 6,237,723 B1 | 5/2001 | Salsman | |
| 6,418,631 B1 * | 7/2002 | Ramsthaler | B43K 23/00 33/41.4 |
| 6,421,928 B1 * | 7/2002 | Miller | A47G 1/205 33/520 |
| 6,473,983 B1 * | 11/2002 | Gier | A47G 1/205 33/613 |
| 6,598,308 B1 * | 7/2003 | Johansson | G01B 5/0025 33/608 |
| 6,769,192 B2 * | 8/2004 | Johansson | G01B 3/08 33/608 |
| 6,785,977 B1 * | 9/2004 | Crichton | A47G 1/205 33/613 |
| 7,040,151 B2 | 5/2006 | Graham | |
| D594,719 S | 6/2009 | Birgl | |
| 7,845,091 B2 | 12/2010 | Clark | |
| 7,963,373 B2 | 6/2011 | Salazar | |
| 8,739,423 B1 * | 6/2014 | Cortum | G01C 9/28 33/613 |
| 9,004,794 B2 | 4/2015 | Whigman | |
| 9,500,462 B2 | 11/2016 | Reble | |
| 9,709,393 B2 * | 7/2017 | Oppenheim | G01C 15/02 |
| 2006/0130348 A1 * | 6/2006 | Lyman, Jr. | B23Q 9/0042 33/520 |
| 2006/0174504 A1 * | 8/2006 | Szumer | B26B 29/06 33/613 |

(Continued)

*Primary Examiner* — Yaritza Guadalupe-McCall

(57) ABSTRACT

A marking and measuring device for assessing a need for a brake adjustment includes a shaft. A marking means is selectively couplable to a first end of the shaft, positioning a user to grasp the shaft proximate to a second end of the shaft and to manipulate the shaft so that the marking means leaves a mark on a push rod of a brake. A ruler is coupled to the shaft proximate to the second end. The shaft is configured to be grasped in the hand of the user proximate to the first end of the shaft, positioning the user to abut the second end to a brake cylinder so that the shaft is substantially parallel to the push rod. The ruler is configured to measure the distance traveled by the mark on the push rod when the brake is actuated to ascertain a need for a brake adjustment.

16 Claims, 3 Drawing Sheets

(56) References Cited

U.S. PATENT DOCUMENTS

| | | | | |
|---|---|---|---|---|
| 2009/0188121 A1* | 7/2009 | Rabin | ................... | G01C 9/26 |
| | | | | 33/332 |
| 2010/0000102 A1* | 1/2010 | Contreras | ............... | B43L 9/245 |
| | | | | 33/27.03 |
| 2011/0113640 A1* | 5/2011 | Molina | ............... | G01B 5/0025 |
| | | | | 33/608 |
| 2015/0075019 A1* | 3/2015 | Spear, IV | ............... | G01B 3/28 |
| | | | | 33/518 |
| 2016/0018222 A1* | 1/2016 | Oppenheim | ............ | G01C 9/34 |
| | | | | 33/669 |
| 2016/0097625 A1* | 4/2016 | Dykes | ................... | G01C 9/34 |
| | | | | 33/701 |
| 2021/0063131 A1* | 3/2021 | Anicette | ............... | B60T 17/00 |

* cited by examiner

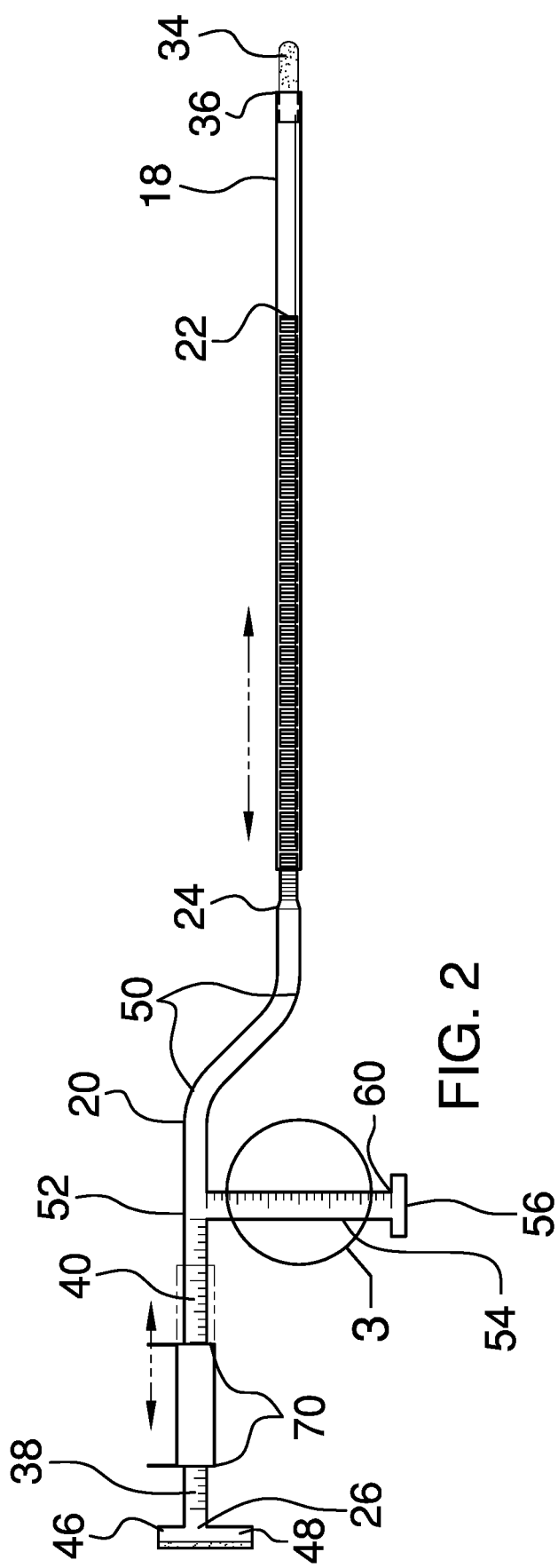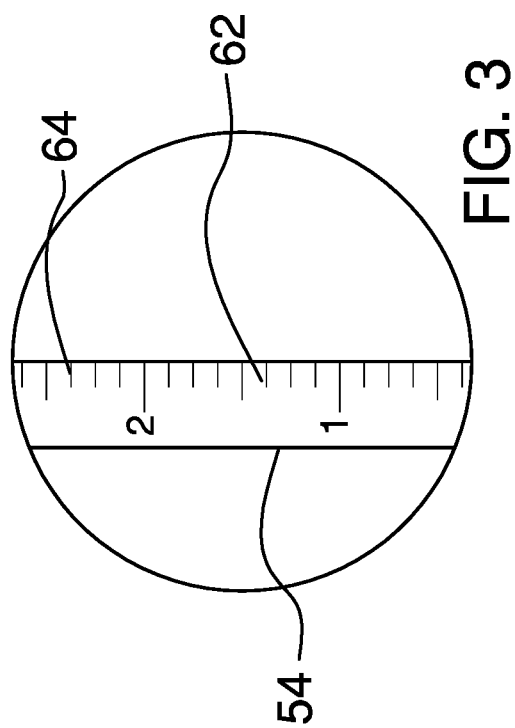

MARKING AND MEASURING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

(g) BACKGROUND OF THE INVENTION

(1) Field of the Invention

(2) Description of Related Art Including Information Disclosed Under 37 CFR 1.97 and 1.98

The disclosure and prior art relate to measuring devices and more particularly pertain to a new measuring device for assessing a need for a brake adjustment.

BRIEF SUMMARY OF THE INVENTION

An embodiment of the disclosure meets the needs presented above by generally comprising a shaft. A marking means is selectively couplable to a first end of the shaft, positioning a user to grasp the shaft proximate to a second end of the shaft and to manipulate the shaft so that the marking means leaves a mark on a push rod of a brake. A ruler is coupled to the shaft proximate to the second end. The shaft is configured to be grasped in the hand of the user proximate to the first end of the shaft, positioning the user to abut the second end to a brake cylinder so that the shaft is substantially parallel to the push rod. The ruler is configured to measure the distance traveled by the mark on the push rod when the brake is actuated to ascertain a need for a brake adjustment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a side view of an embodiment of the disclosure.

FIG. 3 is a detail view of an embodiment of the disclosure.

DETAILED DESCRIPTION OF THE INVENTION

Figure 1:
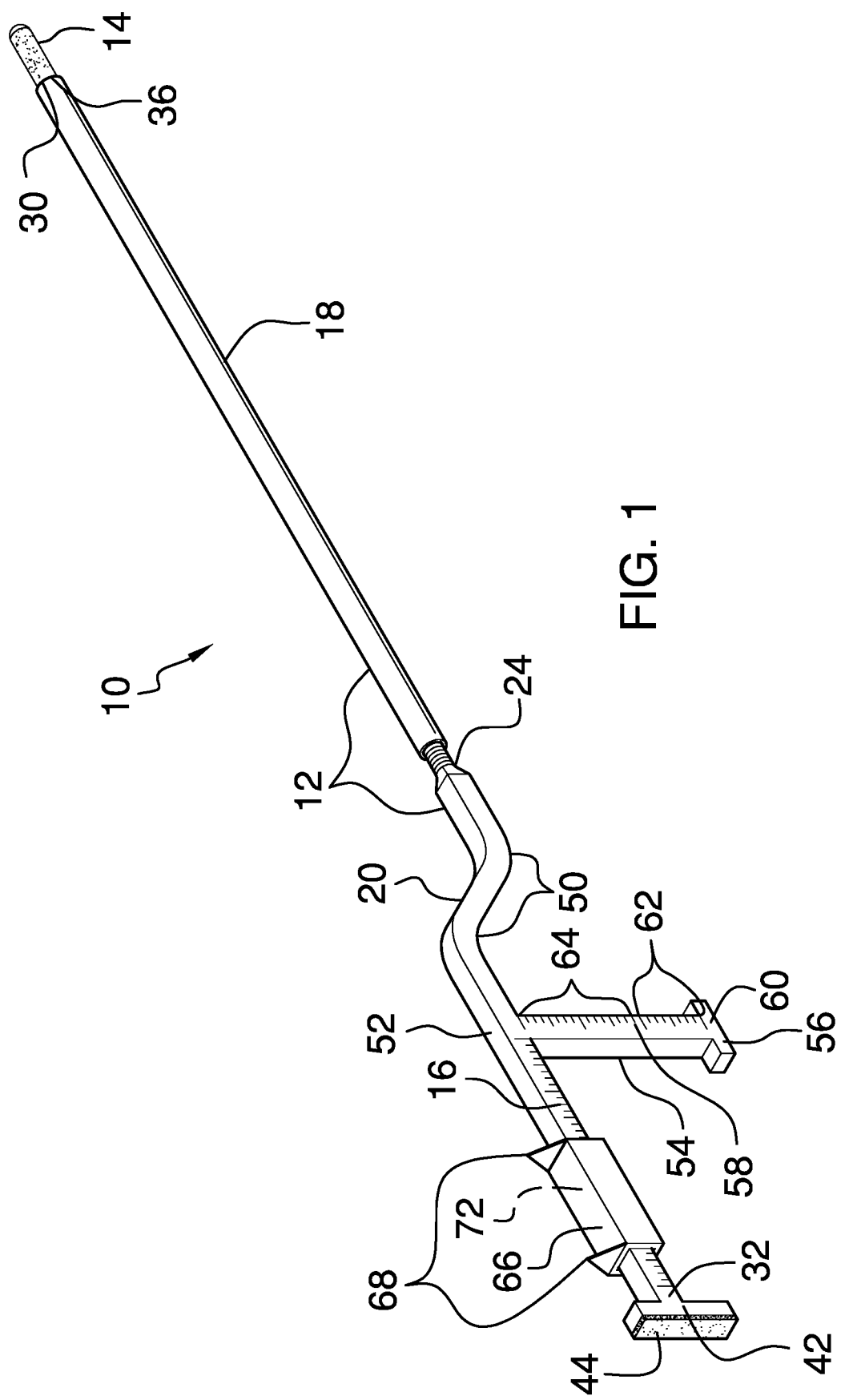
FIG. 1 is an isometric perspective view of a marking and measuring device according to an embodiment of the disclosure.

With reference now to the drawings, and in particular to FIGS. 1 through 4 thereof, a new measuring device embodying the principles and concepts of an embodiment of the disclosure and generally designated by the reference numeral 10 will be described.

Figure 4:
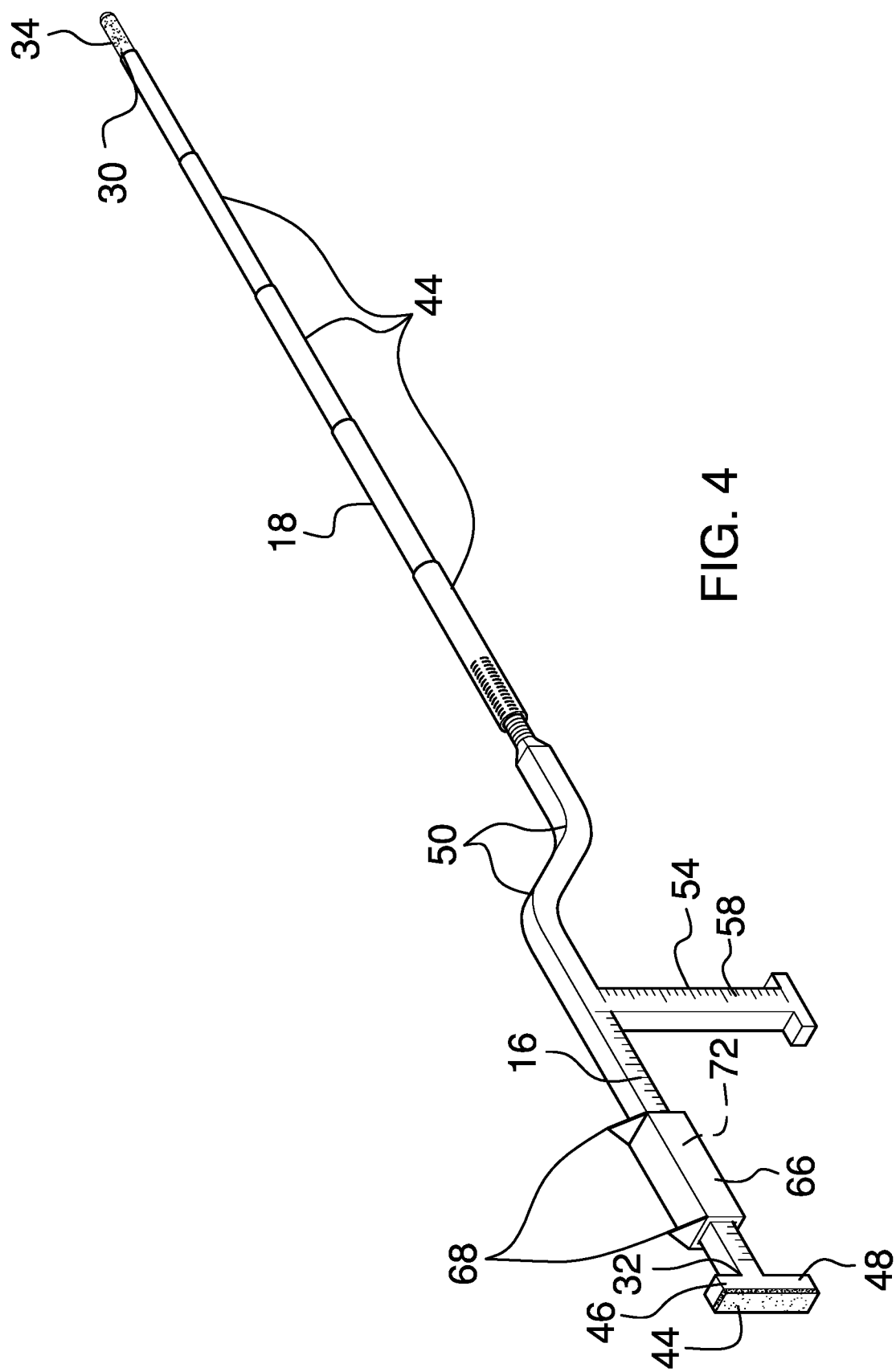
FIG. 4 is an isometric perspective view of an alternative embodiment of the disclosure.

As best illustrated in FIGS. 1 through 4, the marking and measuring device 10 generally comprises a shaft 12, a marking means 14, and a ruler 16. The shaft 12 comprises a first segment 18 and a second segment 20. The first segment 18 is circularly shaped when viewed longitudinally, tubular, and internally threaded. The second segment 20 is externally threaded from a first terminus 22 to proximate to a midpoint 24 of the second segment 20 so that the second segment 20 is selectively threadedly couplable to the first segment 18 and so that the shaft 12 is selectively length adjustable. The second segment 20 from proximate to the midpoint 24 to a second terminus 26 is substantially squarely shaped when viewed longitudinally. The first segment 18 may comprise a plurality of nested sections 28, as shown in FIG. 4, so that the first segment 18 is selectively extensible.

The marking means 14 is selectively couplable to a first end 30 of the shaft 12. The shaft 12 is configured to be grasped in a hand of a user proximate to a second end 32 of the shaft 12, positioning the user to manipulate the shaft 12 so that the marking means 14 leaves a mark on a push rod of a brake. The marking means 14 may comprise a chalk stick 34 or other marking means, such as, but not limited to, a marker, a wax pencil, an etcher, and the like. The chalk stick 34 is selectively partially insertable into the first segment 18 of the shaft 12 from a first endpoint 36 of the first segment 18 to removably couple the chalk stick 34 to the shaft 12.

The ruler 16 is coupled to the shaft 12 proximate to the second end 32. The ruler 16 may use the Imperial System, as shown in FIG. 3, the Metric System, or both of the Imperial System and the Metric System. The shaft 12 is configured to be grasped in the hand of the user proximate to the first end 30 of the shaft 12, positioning the user to abut the second end 32 to a brake cylinder so that the shaft 12 is substantially parallel to the push rod. The ruler 16 is configured to measure the distance traveled by the mark on the push rod when the brake is actuated to ascertain a need for a brake adjustment.

A first length 38 of the ruler 16 that is proximate to the second end 32 of the shaft 12 is green colored. The first length 38 is configured to indicate a passing distance traveled by the push rod. A second length 40 of the ruler 16 that is distal from the second end 32 is red colored. The second length 40 is configured to indicate a failing distance traveled by the push rod.

A bar 42 that is coupled to the second end 32 of the shaft 12 is configured to stabilize the shaft 12 in abutment to the brake cylinder. A magnet 44 that is coupled to the bar 42 is configured to magnetically couple to the brake cylinder to stabilize the shaft 12. A first piece 46 of the bar 42 that extends 3/32 of an inch from the shaft 12 is configured to gauge a depth of a tread of a trailer tire. A second piece 48 of the bar 42 that extends 5/32 of an inch from the shaft 12 is configured to gauge a depth of a tread of a steering tire.

A pair of curves 50 is positioned in the second segment 20 of the shaft 12 proximate to the first terminus 22 of the second segment 20. The pair of curves 50 is S-shaped so that the first segment 18 and a section 52 of the second segment 20 that is distal from the first segment 18 are substantially parallel. The pair of curves 50 is configured to facilitate insertion of the second segment 20 between a chassis and a frame of the vehicle.

A crosspiece 54 is coupled to and extends perpendicularly from the second segment 20 of the shaft 12 proximate to the pair of curves 50. The crosspiece 54 is configured to be grasped in the hand of the user, positioning the user to manipulate the shaft 12 so that the marking means 14 leaves the mark on the push rod of the brake of the brake.

A line gauge 58 is coupled to the crosspiece 54. The shaft 12 is configured to be grasped in the hand of the user proximate to the first end 30 of the shaft 12, positioning the user to abut a terminus 60 of the crosspiece 54 to the brake cylinder so that the shaft 12 is substantially parallel to the push rod. The line gauge 58 is configured to measure the distance traveled by the mark on the push rod when the brake is actuated to ascertain a need for a brake adjustment. With the line gauge 58 being perpendicular to the ruler 16, the user is positioned for testing the brake from in front of the brake, using the ruler 16, or from above, using the line gauge 58. A plate 56 that is coupled to the terminus 60 of the crosspiece 54 is configured to stabilize the crosspiece 54 in abutment to the brake cylinder.

A first portion 62 of the line gauge 58 that is proximate to the terminus 60 of the crosspiece 54 is green colored. The first portion 62 is configured to indicate a passing distance traveled by the push rod. A second portion 64 of the line gauge 58 that is distal from the terminus of the crosspiece 54 is red colored. The second portion 64 is configured to indicate a failing distance traveled by the push rod.

A tube 66 is positioned around the section 52 of the second segment 20 distal from the first segment 18 of the shaft 12 so that the tube 66 is slidable relative to the ruler 16. A pair of protrusions 68 is coupled singly to opposing ends 70 of the tube 66 so that the protrusions extend perpendicularly from the tube 66. Each protrusion 68 is configured to selectively contact a catch, such as a plastic disc, zip tie, or the like, that is coupled to the push rod so that the tube 66 is motivated along the ruler 16 the same distance that the push rod is extended from the brake cylinder.

A spring 72 is coupled to and extends between the tube 66 and the shaft 12. The spring 72 is configured to be tensioned as the tube 66 is motivated distally from the second end 32 by action of the push rod. The spring 72 is positioned to rebound to return the tube 66 to a default position upon disengagement of the brake.

In use, the shaft 12 is adjusted to a suitable length and the chalk stick 34 is inserted into the first endpoint 36 of the first segment 18 of the shaft 12. The user then grasps the shaft 12 proximate to the second end 32 to manipulate the shaft 12 so that the chalk stick 34 marks the push rod adjacent to the brake cylinder. The user then grasps the shaft 12 proximate to the first end 30 to abut the second end 32 to the brake cylinder so that the ruler 16 is positioned for measuring the distance traveled by the mark on the push rod when the brake is actuated. If the extent of travel of the mark is within the first length 38 of the ruler 16, which is green colored, no brake adjustment is required. If the extent of travel of the mark is within the second length 40 of the ruler 16, which is red colored, a brake adjustment is required.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A marking and measuring device comprising:
   a shaft;
   a marking means selectively couplable to a first end of the shaft wherein the shaft is configured for grasping in a hand of a user proximate to a second end of the shaft positioning the user for manipulating the shaft such that the marking means leaves a mark on a push rod of a brake;
   a ruler coupled to the shaft proximate to the second end wherein the shaft is configured for grasping in the hand of the user proximate to the first end of the shaft positioning the user for abutting the second end to a brake cylinder such that the shaft is substantially parallel to the push rod wherein the ruler is configured for measuring the distance traveled by the mark on the push rod when the brake is actuated for ascertaining a need for a brake adjustment; and
   a bar coupled to the second end of the shaft wherein the bar is configured for stabilizing the shaft in abutment to the brake cylinder.

2. The device of claim 1, further including the marking means comprising a chalk stick selectively partially insertable into the first segment of the shaft from a first endpoint for removably coupling the chalk stick to the shaft.

3. The device of claim 1, further including a first piece of the bar extending 3/32 of an inch from the shaft wherein the first piece is configured for gauging a depth of a tread of a trailer tire, a second piece of the bar extending 5/32 of an inch from the shaft wherein the second piece is configured for gauging a depth of a tread of a steering tire.

4. The device of claim 1, further including a magnet coupled to the bar wherein the magnet is configured for magnetically coupling to the brake cylinder for stabilizing the shaft.

5. The device of claim 1, further comprising:
the shaft comprising a first segment and a second segment, the first segment being circularly shaped when viewed longitudinally, the first segment being tubular, the first segment being internally threaded, the second segment being externally threaded from a first terminus to proximate to a midpoint of the second segment such that the second segment is selectively threadedly couplable to the first segment and such that the shaft is selectively length adjustable, the second segment from proximate to the midpoint to a second terminus being substantially squarely shaped when viewed longitudinally, the first segment comprising a plurality of nested sections such that the first segment is selectively extensible;
the marking means comprising a chalk stick selectively partially insertable into the first segment of the shaft from a first endpoint for removably coupling the chalk stick to the shaft;
a first length of the ruler proximate to the second end of the shaft being green colored wherein the first length is configured for indicating a passing distance traveled by the push rod, a second length of the ruler distal from the second end being red colored wherein the second length is configured for indicating a failing distance traveled by the push rod;
a first piece of the bar extending 3/32 of an inch from the shaft wherein the first piece is configured for gauging a depth of a tread of a trailer tire, a second piece of the bar extending 5/32 of an inch from the shaft wherein the second piece is configured for gauging a depth of a tread of a steering tire;
a magnet coupled to the bar wherein the magnet is configured for magnetically coupling to the brake cylinder for stabilizing the shaft;
a pair of curves positioned in the second segment of the shaft proximate to the first terminus of the second segment, the pair of curves being S-shaped such that the first segment and a section of the second segment distal from the first segment are substantially parallel wherein the pair of curves is configured for facilitating insertion of the second segment between a chassis and a frame of the vehicle;
a crosspiece coupled to and extending perpendicularly from the second segment of the shaft proximate to the pair of curves wherein the crosspiece is configured for grasping in the hand of the user positioning the user for manipulating the shaft such that the marking means leaves the mark on the push rod of the brake of the brake;
a line gauge coupled to the crosspiece wherein the shaft is configured for grasping in the hand of the user proximate to the first end of the shaft positioning the user for abutting a terminus of the crosspiece to the brake cylinder such that the shaft is substantially parallel to the push rod wherein the line gauge is configured for measuring the distance traveled by the mark on the push rod when the brake is actuated for ascertaining a need for a brake adjustment, a first portion of the line gauge proximate to the terminus of the crosspiece being green colored wherein the first portion is configured for indicating a passing distance traveled by the push rod, a second portion of the line gauge distal from the terminus of the crosspiece being red colored wherein the second portion is configured for indicating a failing distance traveled by the push rod;
a plate coupled to terminus of the crosspiece wherein the plate is configured for stabilizing the crosspiece in abutment to the brake cylinder;
a tube positioned around the section of the second segment distal from the first segment of the shaft such that the tube is slidable relative to the ruler;
a pair of protrusions coupled singly to opposing ends of the tube such that the protrusions extend perpendicularly from the tube wherein each protrusion is configured for selectively contacting a catch coupled to the push rod such that the tube is motivated along the ruler the same distance the push rod is extended from the brake cylinder; and
a spring coupled to and extending between the tube and the shaft wherein the spring is configured for tensioning as the tube is motivated distally from the second end by action of the push rod and such that the spring is positioned for rebounding for returning the tube to a default position upon disengagement of the brake.

6. A marking and measuring device comprising:
a shaft;
a marking means selectively couplable to a first end of the shaft wherein the shaft is configured for grasping in a hand of a user proximate to a second end of the shaft positioning the user for manipulating the shaft such that the marking means leaves a mark on a push rod of a brake;
a ruler coupled to the shaft proximate to the second end wherein the shaft is configured for grasping in the hand of the user proximate to the first end of the shaft positioning the user for abutting the second end to a brake cylinder such that the shaft is substantially parallel to the push rod wherein the ruler is configured for measuring the distance traveled by the mark on the push rod when the brake is actuated for ascertaining a need for a brake adjustment; and
the shaft comprising a first segment and a second segment, the first segment being circularly shaped when viewed longitudinally, the first segment being tubular, the first segment being internally threaded, the second segment being externally threaded from a first terminus to proximate to a midpoint of the second segment such that the second segment is selectively threadedly couplable to the first segment and such that the shaft is selectively length adjustable.

7. The device of claim 6, further including the second segment from proximate to the midpoint to a second terminus being substantially squarely shaped when viewed longitudinally.

8. The device of claim 6, further including the first segment comprising a plurality of nested sections such that the first segment is selectively extensible.

9. The device of claim 6, further including a pair of curves positioned in the second segment of the shaft proximate to the first terminus of the second segment, the pair of curves being S-shaped such that the first segment and a section of the second segment distal from the first segment are substantially parallel wherein the pair of curves is configured for facilitating insertion of the second segment between a chassis and a frame of the vehicle.

10. The device of claim 9, further including a crosspiece coupled to and extending perpendicularly from the second segment of the shaft proximate to the pair of curves wherein the crosspiece is configured for grasping in the hand of the user positioning the user for manipulating the shaft such that the marking means leaves the mark on the push rod of the brake of the brake.

11. The device of claim 10, further including a line gauge coupled to the crosspiece wherein the shaft is configured for grasping in the hand of the user proximate to the first end of the shaft positioning the user for abutting a terminus of the crosspiece to the brake cylinder such that the shaft is substantially parallel to the push rod wherein the line gauge is configured for measuring the distance traveled by the mark on the push rod when the brake is actuated for ascertaining a need for a brake adjustment.

12. The device of claim 11, further including a first portion of the line gauge proximate to the terminus of the crosspiece being green colored wherein the first portion is configured for indicating a passing distance traveled by the push rod, a second portion of the line gauge distal from the terminus of the crosspiece being red colored wherein the second portion is configured for indicating a failing distance traveled by the push rod.

13. The device of claim 11, further including a plate coupled to terminus of the crosspiece wherein the plate is configured for stabilizing the crosspiece in abutment to the brake cylinder.

14. The device of claim 9, further comprising:
a tube positioned around the section of the second segment distal from the first segment of the shaft such that the tube is slidable relative to the ruler; and
a pair of protrusions coupled singly to opposing ends of the tube such that the protrusions extend perpendicularly from the tube wherein each protrusion is configured for selectively contacting a catch coupled to the push rod such that the tube is motivated along the ruler the same distance the push rod is extended from the brake cylinder.

15. The device of claim 14, further including a spring coupled to and extending between the tube and the shaft Wherein the spring is configured for tensioning as the tube is motivated distally from the second end by action of the push rod and such that the spring is positioned for rebounding for returning the tube to a default position upon disengagement of the brake.

16. A marking and measuring device comprising:
a shaft;
a marking means selectively couplable to a first end of the shaft wherein the shaft is configured for grasping in a hand of a user proximate to a second end of the shaft positioning the user for manipulating the shaft such that the marking means leaves a mark on a push rod of a brake;
a ruler coupled to the shaft proximate to the second end wherein the shaft is configured for grasping in the hand of the user proximate to the first end of the shaft positioning the user for abutting the second end to a brake cylinder such that the shaft is substantially parallel to the push rod wherein the ruler is configured for measuring the distance traveled by the mark on the push rod when the brake is actuated for ascertaining a need for a brake adjustment; and
a first length of the ruler proximate to the second end of the shaft being green colored wherein the first length is configured for indicating a passing distance traveled by the push rod, a second length of the ruler distal from the second end being red colored wherein the second length is configured for indicating a failing distance traveled by the push rod.

* * * * *